Patented June 17, 1930

1,764,032

UNITED STATES PATENT OFFICE

ROBERT AMES NORTON, OF CRAFTON, PENNSYLVANIA, ASSIGNOR TO THE SELDEN COMPANY, OF PITTSBURGH, PENNSYLVANIA, A CORPORATION OF DELAWARE

HYDRAULIC TRANSMISSION FLUID

No Drawing. Application filed April 16, 1929. Serial No. 355,679.

This invention relates to methods of transmitting power or pressure hydraulically and more particularly to the use of a special liquid medium.

Hydraulic transmissions in the past, especially hydraulic brakes for automotive vehicles and similar transmissions, have utilized a number of fluids. Water has been used in some cases but it presents serious disadvantages because it corrodes metals, freezes readily, and has low lubricating value. Various types of oils have been used, as has alcohol and other liquids. A common composition consists of castor oil and ethyl or butyl alcohol. Castor oil has the disadvantage that it is a vegetable oil and thus capable of gradual deterioration, while alcohol is sufficiently volatile to result in losses.

According to the present invention hydrogenated phthalids, such as hexahydrophthalid, are used as pressure transmitting media in hydraulic transmissions. The hydrogenated phthalids are oils having a high boiling point and do not readily freeze, they are very stable, inert chemically, do not attack metals at ordinary temperatures, and are sufficiently oily to provide satisfactory lubrication. They do not attack rubber to anything like the extent of some other liquids used, such as glycerine and mineral oils and, therefore, can be used with systems requiring flexible connections, such as automobile braking systems, and the like.

I prefer to use hexahydrophthalid as it is the cheapest hydrogenated phthalid and possesses the lowest freezing point. Hexahydrophthalid has the following chemical formula:

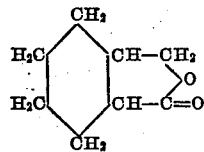

However, for some purposes, a somewhat more viscous material is required and hydrogenated phthalids having less hydrogen or hydrogenated alkyl phthalids containing one or more alkyl radicals substituted in the oxamethyl group may be employed and of course all hydrogenated phthalids, whether substituted or unsubstituted are included in the broad scope of the invention.

For many purposes the hydrogenated phthalids may be used alone but it is advantageous in some cases to mix them with ethyl, isopropyl or butyl alcohol and in some cases other liquids may be present. Of course when hydrogenated phthalids are used in mixtures with other liquids the resulting product is open to any disadvantages which may be inherent in the liquids mixed with the hydrogenated phthalids. Nevertheless, for automobile brake service I find that a mixture of ethyl alcohol and hexahydrophthalid is very suitable. This mixture may contain up to as much as 50–60% of alcohol and in some cases even more.

In the claims "a substantial portion" is used to define an amount of hydrogenated phthalid substance which is sufficient to have a substantial effect on the physical characteristics of the liquid composition defined in the claims.

What is claimed as new is:

1. A process of power transmission which comprises transmitting power by means of a liquid containing a substantial portion of a hydrogenated phthalid substance.

2. A process of power transmission which comprises transmitting power by means of a liquid containing a substantial portion of a hydrogenated phthalid substance unsubstituted in the oxamethyl group.

3. A process of power transmission which comprises transmitting power by means of a liquid containing a substantial portion of hexahydrophthalid.

4. A process of power transmission which comprises transmitting power by means of a liquid containing a substantial portion of a hydrogenated phthalid substance admixed with at least one other liquid miscible therewith.

5. A process of power transmission which comprises transmitting power by means of a liquid containing a substantial portion of a hydrogenated phthalid substance unsubstituted in the oxamethyl group admixed with at least one other liquid miscible therewith.

6. A process of power transmission which comprises transmitting power by means of a liquid containing a substantial portion of hexahydrophthalid admixed with at least one other liquid miscible therewith.

7. A method according to claim 4 in which one of the added liquids is an alcohol.

8. A method according to claim 5 in which one of the added liquids is an alcohol.

9. A method according to claim 6 in which one of the added liquids is an alcohol.

Signed at Pittsburgh, Pennsylvania this 12th day of April, 1929.

ROBERT AMES NORTON.